United States Patent Office 2,990,624
Patented July 4, 1961

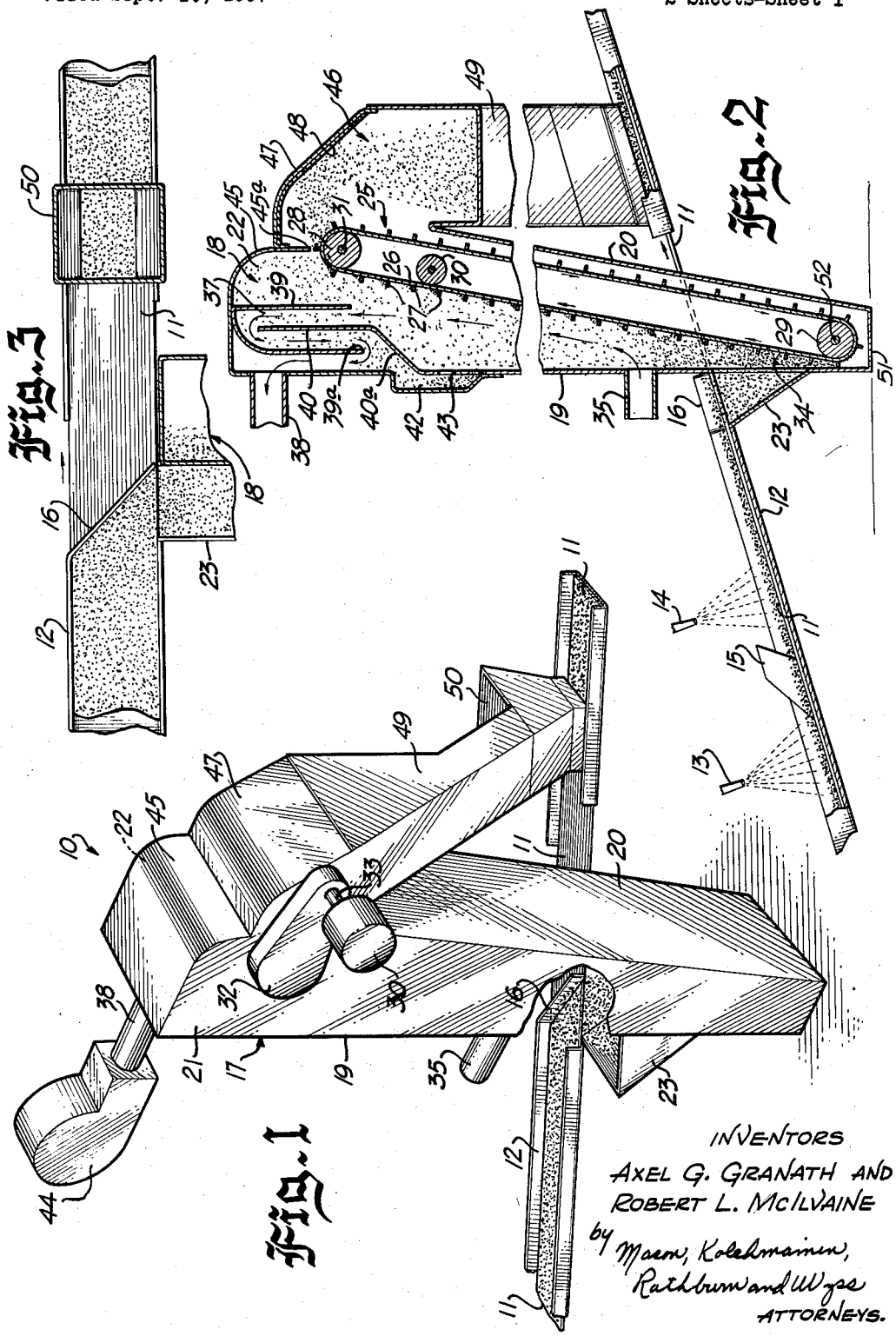

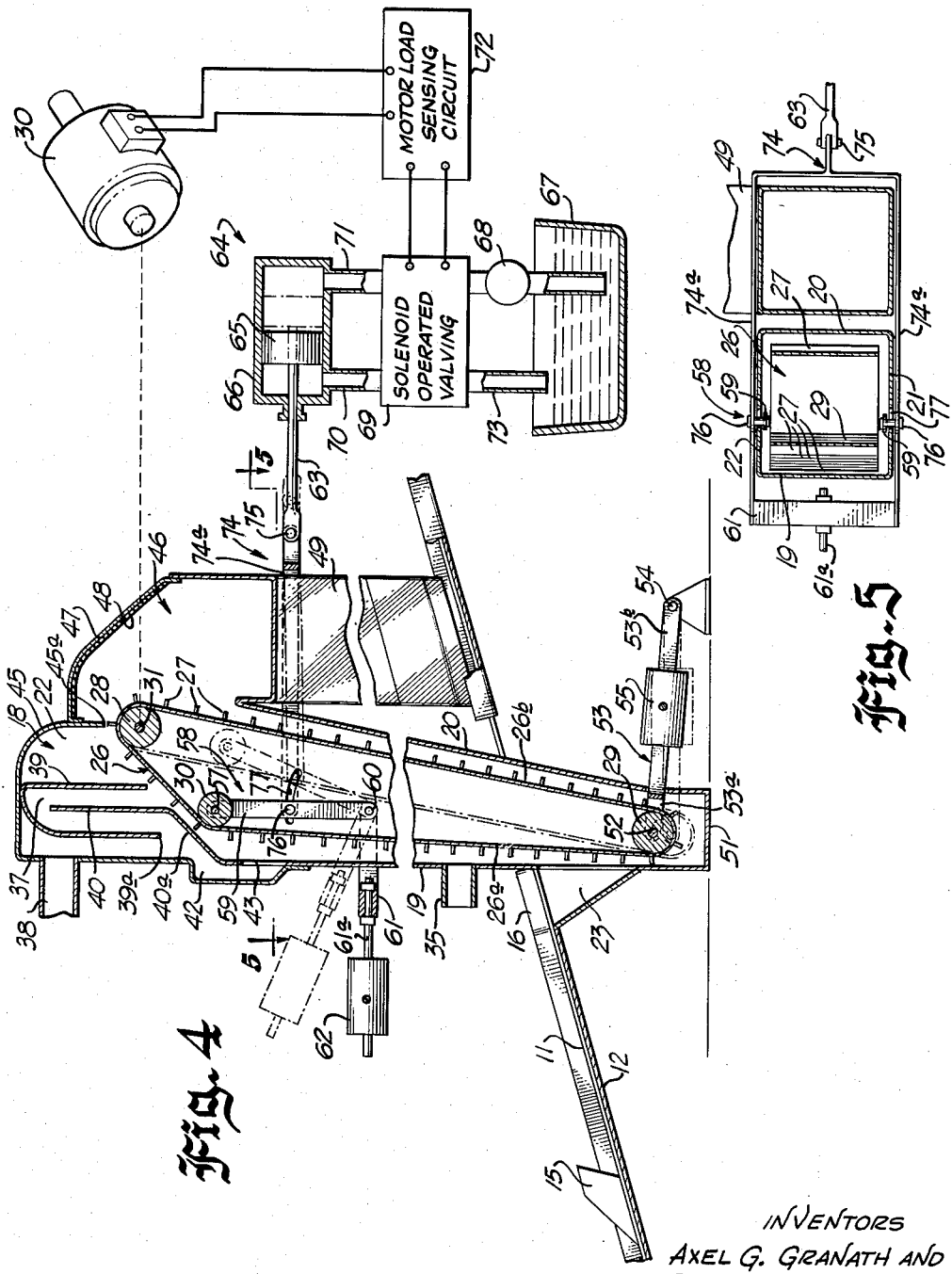

2,990,624
APPARATUS FOR COOLING GRANULAR MATERIAL
Axel G. Granath, Chicago, and Robert L. McIlvaine, Winnetka, Ill., assignors to Herbert Simpson Corporation, Chicago, Ill., a corporation of Illinois
Filed Sept. 16, 1957, Ser. No. 684,343
12 Claims. (Cl. 34—102)

This invention relates generally to an apparatus for cooling granular material and, more particularly, to an apparatus for tempering and conditioning foundry sand for use in a molding operation or the like.

In foundry operations molding sand may be reused following a molding operation if it is mulled, moistened, cooled and treated as, for example, by the addition of a suitable binder. However, the equipment used to perform these operations is generally quite complex and considerable time is usually consumed in the performance of the desired operations, especially the cooling and moistening steps which must be so performed that the cores of the sand particles are cooled. The bulk and expense of the equipment presently in use to perform the cooling and dampening steps is such that small foundries are at a decided disadvantage.

It is therefore, the primary object of the present invention to provide a compact, inexpensive, yet efficient unit for tempering and conditioning sand or other granular material during its transport from a shake-out station to an area where it is distributed for reuse at a molding station.

Another object of the present invention is to provide a new and improved apparatus for cooling granular material while it is being elevated.

A further object of the invention is the provision of a new and improved apparatus for aerating and cooling granular material such as sand used in a molding operation.

It is another object of the present invention to provide an improved apparatus for controlling the amount of moisture contained in the sand following a cooling operation in order to produce proper adherence of the sand particles when they are delivered to a mold and, at the same time, to facilitate handling of the sand as it traverses the different stations in a foundry.

A further object of the invention is to provide a sand cooling apparatus which automatically adjusts itself to the rate of delivery of the incoming sand in order to insure that the average time that the sand remains in the apparatus for treatment is uniform regardless of the rate of introduction of inlet sand.

In accordance with the present invention the foregoing and other objects are realized by the provision of a treating chamber for receiving hot, moistened, granular material and for discharging properly conditioned relatively cool material suitable for use in subsequent molding operations. An elevator within the treating chamber receives the incoming sand and carries it upwardly upon a plurality of spaced apart parallel flights which are exposed to a flow of cooling air. The airflow picks up the granular material and forms a turbulent, material laden air volume which is circulated within the chamber in order to drive off a portion of the moisture in the granular material, thereby to cool the material. The air volume within the chamber is drawn through a tortuous passageway which functions to separate the granular material while the cooling air is exhausted through an outlet port leading from the chamber. The granular material separated from the air volume is returned to the treating chamber for further treatment. The granular material remaining upon the elevator is forcibly discharged by centrifugal force against a resilient cushion which functions to break up the sand and minimize compacting.

Further objects and advantages of the present invention will become apparent from the following detailed description of an illustrative embodiment thereof taken in conjunction with the accompanying drawings wherein:

FIG. 1 is a perspective view illustrating cooling apparatus characterized by the features of the present invention with a portion of the housing being broken away in order to illustrate certain details of the material feeding equipment;

FIG. 2 is a fragmentary, elevational view principally in section illustrating the apparatus shown in FIG. 1;

FIG. 3 is a fragmentary top plan view illustrating the apparatus shown in FIGS. 1 and 2;

FIG. 4 is a view similar to FIG. 2 and is partially diagrammatic to illustrate certain features of the present invention; and FIG. 5 is a sectional view taken along a line substantially corresponding to the line 5—5 in FIG. 4 assuming, of course, that the latter shows the entire apparatus.

Referring now to the drawings and more particularly to FIG. 1 thereof, the present invention is there illustrated as comprising a sand cooling and treating apparatus indicated generally by the reference numeral 10 for receiving hot granular material such as sand from a suitable conveyor which, in the installation illustrated in FIG. 1, takes the form of an endless belt 11. While the apparatus 10 has been shown for receiving material from a continuous belt, it will be apparent that other types of sand delivering apparatus may be used to supply granular material to the inlet of this apparatus. For example, the apparatus 10 may receive the discharge from a mixer or muller of conventional construction or, alternatively, this apparatus may be fed directly from a payloader hopper or the like. The ensuing description, however, is concerned with the use of the apparatus when the conveyor 11 receives molding sand from a shakeout station after this sand has been suitably screened by means of a conventional screen in which case the conveyor belt 11 may pass through a trough or other sand retaining guide indicated by the reference numeral 12. This trough includes a bottom and opposed side portions extending along the side edges of the conveyor belt for the purpose of preventing the sand or granular material from falling from the belt.

Prior to its introduction to the cooling apparatus 10 the sand may be moistened by means of water delivered through a plurality of nozzles 13 and 14 (FIG. 2). These nozzles are adapted to spray water upon the sand at various intervals along its path of travel in order to cool the sand and at the same time to restore a portion of the moisture which was lost in making the casting at the molding station. Disposed between the nozzles 13 and 14 is a plow 15 which functions to turn over the sand on the conveyor belt 11 in order to effect uniform distribution of the moisture within the sand. The sand is removed from the belt 11 and is directed into the apparatus 10 by means of a plow 16 which, as indicated in FIGS. 1 and 2, may take the form of an extension of the side wall of the trough 12. This extension overlies the belt 11 and deflects the sand thereon into the inlet of the apparatus 10. The latter apparatus includes a housing 17 defining a generally vertically extending treating chamber 18. The housing includes a vertically extending front wall 19, an inclined rear wall 20 and a pair of parallel extending side walls 21 and 22 interconnecting the front and rear walls. The housing 17 is completed by a curved top wall 45 and a flat bottom wall 51.

As indicated above, a hopper 23 or other suitable material receiving inlet is defined in the front wall 19 for the purpose of receiving sand for treatment by the apparatus 10. The hopper 23, of course, opens to the chamber 18 and delivers the inlet sand received from the conveyor 11 to an elevator indicated generally by the reference numeral 25. This elevator is similar in construction to the elevating mechanism disclosed in copending application Serial No. 536,613 filed September 26, 1955, and assigned to the same assignee as the present invention. The elevator 25 comprises an endless belt 26 carrying in fixed, spaced apart relationship a plurality of angled cleats defining ledges or flights 27. As described in detail in the above identified application Serial No. 536,613 the outer edge of each of these flights is preferably serrated in order to facilitate the pickup of the sand delivered to the chamber 18 from the hopper 23. The endless belt 26 is adapted to be moved at high speed about suitably mounted pulleys or drive rolls 28, 29 and 30.

The upper pulley 28 is mounted upon a shaft 31 which is adapted to be driven from a suitable motor or other prime mover 30. To this end, a suitable drive connection enclosed within a protective housing 32 carried upon the sidewall 21 of the housing 17 interconnects the motor shaft and the shaft 31. The drive connection may comprise a V belt which is trained over a pulley carried upon motor shaft 33 and over a second pulley carried upon the shaft 31 although this is not shown in the drawing.

As shown in FIG. 4, the lower pulley or roller 29 is mounted upon a shaft 52 having its ends journalled within arms 53a of a mounting yoke 53. The mounting yoke may include a depending leg 53b which is pivotally mounted upon a fixed pin 54. The pin 54 may be secured to a wall of the housing 17 or, alternatively, may be mounted upon fixed structure disposed adjacent to the housing. In order to urge the yoke 53 to pivot about the pin 54 in a counterclockwise direction as viewed in FIG. 4, thereby to tension the belt 26, the leg 53b carries a weight 55 which is secured to the leg by means of a set screw or the like. The size of the weight 55 and the position at which it is secured along the leg 53b, of course, determines the amount of tension applied to the belt 26.

The pulley or roller 30 functions to control the disposition of the forward or front run 26a of the belt 26 and, to this end, the pulley 30 is mounted upon a shaft 57 having its opposed ends journaled within a bell crank type assembly 58. Specifically, each end of the shaft 57 is mounted for rotation upon the upper end of a somewhat vertical leg 59 of a mounting yoke forming a part of the bell crank assembly 58. The joint of the bell crank assembly is mounted for pivotal movement about pins 60 secured to the side walls 21 and 22 of the housing 17. The bell crank assembly further comprises a somewhat horizontal U-shaped leg 61 having a depending arm 61a thereon carrying a weight 62 which is preferably secured in fixed but adjustable position by means of a set screw or the like so that the bell crank is urged to pivot about the pins 60 in a counterclockwise direction as viewed in FIG. 4 in order to force the roller 30 against the undersurface of the belt 26. Again, the size of the weight 62 and its position along the arm 61a determines the amount of force applied to the belt by the roller 30.

Each of the flights 27 is relatively narrow in comparison to its length and, as a consequence, defines a narrow ledge for digging into the sand mass located in the bottom area 34 of the chamber 18 and for picking up and spacing the sand particles on the ledge. Thus, it will be recognized that when the belt 26 is driven at high speed the flights are moved through the sand mass at a similar high speed in order to pick up the particles of sand. The sand particles are thus serated and are moved vertically upward within the chamber 18. It has been found that driving the belt 26 at a rate of approximately 500 feet per minute provides optimum results for aerating and cooling the sand but good results are obtained in a range of approximately 300 to 600 feet per minute.

As the sand particles are carried upwardly by the elevator 25 they are subjected to a stream of cooling air entering the chamber 18 through an air inlet 35 which may be open to atmosphere or, alternatively, which may be supplied with pressurized air from a blower or the like (not shown). As illustrated in FIGS. 1 and 2, the inlet 35 is located above the hopper 23 and passes over a number of the flights 27 thus entraining within the air stream many of the sand particles being transported upwardly upon the flights. The action of the cooling gas in picking up sand from the elevator 25 produces a sand laden volume within the chamber 18. A portion of the sand remaining on the belt 26 and the flights 27 is thrown upwardly against the curved top wall 45 of the housing as the belt 26 passes over the upper pulleys 28 and 30. The sand thrown against the wall 45 is broken up and deflected back towards the center of the chamber 18 where it is entrained within the air volume within the chamber. This air volume is turbulent so that the sand particles are subjected to the air stream in order to cool the particles both by the action of the cooling air and by driving off a portion of the moisture supplied to the sand through the nozzles 13 and 14, thereby taking advantage of the latent heat of vaporization. The sand laden volume within the chamber 18 is drawn through a tortuous passage indicated generally by the reference numeral 37 where the sand particles are separated from the cooling gas and returned to the chamber 18, while the air remaining after the separation is exhausted through a gas outlet passage 38. A suction fan 44 urges the sand laden volume within the chamber 18 through the tortuous passage 37 and exhausts the air through the outlet 38.

The tortuous passage 37 is defined by a generally channel-shaped plate 39 secured to the top wall 45 and extending between the side walls 21 and 22 of the housing 17 and by a baffle plate 40 extending inwardly from the front wall 19 and upwardly into the channel of the plate 39. The baffle 40 also extends between the side walls 21 and 22 of the housing and includes a bottom wall portion 40a which tapers downwardly in order to direct the sand particles separated from the cooling gas into a sand return chamber 42. The latter chamber is defined upon the front wall 19 of the housing and includes an opening 43 through which the sand is delivered back into the treating chamber 18. The air is thus drawn through the passage 37 and when it passes around the lower edge of 39a of the channel plate 39 the high velocity sand particles are thrown outwardly into the chamber 42 from which they are returned to the treating chamber 18 through the opening 43. The suction from 44 draws the air remaining after the sand separation through the outlet 38 and exhausts it to atmosphere. After the sand has been subjected to the cooling action of the air stream it is again collected upon the flights 27 and is carried upwardly within the chamber 18 by means of the elevator 25. Thus the sand on the flights comprises a mixture of the incoming sand from hopper 23 and the cooled, treated sand passed downwardly through chamber 18. At the upper end of the conveyor 25 the sand is discharged from the chamber 18 by throwing it outwardly by centrifugal force as the flights 27 pass over the upper roller or pulley 28. To this end, the top wall 45 of the housing 17 is dimensioned so that its lower edge portion 45a just clears the flights 27. Thus, the edge portion 45a and the rear wall 20 of the housing cooperate to define a material discharge outlet through which the sand is thrown by the elevator 25 into a discharge chamber 46. The chamber 46 includes a top wall portion or frame 47 to which is secured in any suitable manner a resilient cushioning or damping element 48 formed of flexible material such as rubber or the like. The chamber 46 is connected through a sand delivery passage 49 to a discharge hopper 50 which functions to re-deposit the treated sand upon the continuously moving conveyor belt 11. Thus, the sand discharged from the treating chamber 18 by means of the elevator 25 is forcibly thrown against the cushioning element 48 so that any sand or other granular material coming into contact with the cushioning element is broken up by impact and is passed downwardly to the hopper 50. In the event that the moist sand tends to adhere to the resilient element 48 and unbalance of forces is set up in the element which tends to distort it and, hence, to loosen and remove the material. Moreover, the sand striking the resilient element sets up vibrations which inhibit the granular material from sticking to its outer surface.

As indicated above, the amount of moisture remaining in the sand delivered to the hopper 50 may be controlled by regulating the amount of water delivered through the nozzles 13 and 14. The time that the sand remains within the chamber 18 is determined by the speed of drive of the belt 26. In accordance with one embodiment of the present invention the water delivered to the sand through the nozzles 13 and 14 was regulated so that the sand flowing through the inlet hopper 23 contained approximately 2 percent moisture by weight. About half of this moisture was driven off in the treating chamber 18 so that the sand discharged to the hopper 50 contained approximately 1 percent moisture by weight and, hence, was suitable for use in subsequent molding operations. In accordance with this embodiment of the invention the sand was fed to the inlet hopper 23 at a rate of approximately one ton per minute and the elevator mechanism 25 was driven at a speed sufficient to enable the apparatus 10 to handle approximately two tons per minute. Accordingly, the sand remained in the treating chamber 18 for an average of one minute before it was discharged to the hopper 50. Of course, other rates of speed of the incoming said and handling rate of the apparatus 10 may be employed in order to control the time that the sand remains within the chamber 18, thus controlling the degree of cooling and the amount of moisture driven off from the sand.

It has been found that it is desirable to control the disposition of the front run 26a of the flexible belt 26 in order to compensate for varying rates of feeding the incoming sand. Thus if sand is introduced at a rate less than one ton per minute, the sand would, unless other conditions are altered, remain in the treating chamber for a correspondingly shorter period than one minute. In accordance with an important feature of the present invention, the handling capacity of the belt may be varied by causing the position of its front run 26a to change in order to control the amount of sand falling back into the chamber 18 from the belt. To effect this result, the bellcrank assembly 58 is connected to a drive rod 63 preferably operated by a hydraulic piston and cylinder assembly 64. Specifically, the drive rod 63 is pivotally joined, as indicated at 75, to a bifurcated connecting arm 74 the legs 74a of which extend along the sides of the apparatus 10. The legs 74a are pivotally secured to the legs 59 of the bellcrank by means of pivot pins 76 extending through elongated arcuate openings 77 in the side walls 21 and 22 of the housing. The drive rod 63 is also connected to a piston 65 which is moved back and forth within a cylinder 66 in response to the load on the motor 30. Fluid for operating the piston 65 is supplied from a tank or reservoir 67 by means of a pump 68 of conventional construction. The fluid from the pump 68 is delivered through solenoid operated valving 69 to one side of the other of the piston 65 through fluid conduits 70 and 71. The solenoids of the valving 69 are controlled by a load sensing circuit 72 which responds to the load on the motor 30 to operate the valving 69 in accordance with this load. Thus, when the apparatus 10 is receiving sand at a normal rate, the amount of sand collected in the bottom 34 of the chamber 18 is such that the resistance encountered by the flights 27 as they pass through the sand mass induces a normal load on the motor 30. Under these conditions, the load sensing circuit 72 detects the normal load on the motor and operates the valving 69 to position the piston 65 in the center of the cylinder 66 as viewed in FIG. 4. When the piston is approximately centered longitudinally of the cylinder 66, the sensing circuit 72 is preferably rendered effective to operate the valving 69 so that both of the fluid conduits 70 and 71 are blocked, thus maintaining the piston 65 in its center position. Thus, the piston 65 holds the bell crank assembly 58 in its center position and, as a result, the front run 26a of the belt 26 is disposed in a position midway between the solid and broken line positions shown in FIG. 4. When the belt run 26a is in the described center position a portion of the sand adhering thereto tends to fall back into the chamber 18 and, in addition, the sand is thrown outwardly and against the top wall 45 of the housing 17 by the flights 27 as they pass over the roller 30. The sand is thus broken up as it is impacted against the wall 45 and is returned to the chamber 18 for further treatment.

If the rate of delivering the incoming sand decreases, the level of the sand mass at the bottom 34 of the chamber tends to decrease and the load on the motor 30 is reduced and this reduction is detected by the circuit 72 which functions to operate the valving 69 in order to deliver fluid to the right side of piston 65 through conduit 71. At the same time, valving 69 is effective to connect the conduit 70 to exhaust line 73 so that the piston is moved to the left as viewed in FIG. 4. Movement of the piston to the left, of course, rotates the bell crank assembly 58 in a counterclockwise direction as viewed in FIG. 4 and causes the front run 26a of the belt to occupy a substantially vertical position illustrated by the solid lines. Thus, more of the sand on the belt falls back into the chamber 18 and less is thrown out through the discharge opening of the housing. As a result the sand remains within the chamber for a longer period of time, thereby to compensate for the effect of the reduction in rate of delivery of the incoming sand.

If the rate of delivery of the sand to the chamber 18 is increased above normal, the load on the motor 30 is increased and the sensing circuit 72 renders the valving 69 effective to deliver fluid through conduit 70 to the left hand side of piston 65, and to connect the right hand side of the piston to the exhaust line 73. Thus, the piston 65 is moved to the right end of the cylinder 66 and the bell crank assembly 58 is pivoted in a clockwise direction as viewed in FIG. 4. The belt 26 then occupies the position indicated by the broken lines in FIG. 4 wherein the front run 26a is shown as forming an increasing angle with respect to the vertical. The position of rear run 26b of the belt does not change during the automatic adjustment of the position of the front run. Specifically, the rear run 26b extends generally parallel to the sloping rear wall 20 of the housing and is spaced from the latter wall by a distance just in excess of the width of the flights 27, thereby preventing an accumulation of sand between the rear wall 20 and the rear run 26b of the belt. The flights also pass relatively close to the bottom wall 51 and to the lower portion of the front wall 19 in order to provide for the effective pickup of sand entering the chamber 18 through the hopper 23.

In view of the foregoing description it will be recognized that the parts of the apparatus 10 are so arranged that a large quantity of sand can be treated by means of a device having minimum height dimensions which device, is therefore, capable of use in foundry buildings where the overhead space is relatively small. Furthermore, the sand cooling is effective while the sand is in transit from one station to another in a foundry operation, thus avoiding the relatively long time delay which characterizes sand cooling devices of the prior art.

It will further be recognized that the present invention provides a method of cooling granular material by moistening the granular material, elevating the material within an enclosed chamber, forcibly passing a cooling gas upwardly through the chamber and over the material during its elevation in order to drive off at least a portion of the moisture and to entrain a portion of the granular material within the cooling gas, thereby to form a material laden gas volume within the chamber, removing at least a portion of the granular material from the gas volume and passing it downwardly through the chamber, exhausting the gas after the extraction of the granular material, and throwing the granular material outwardly from the chamber after it has been elevated.

While a particular embodiment of the invention has been shown and described it will be recognized that many modifications will readily occur to those skilled in the art and it is therefore contemplated by the appended claims to cover any such modifications as fall within the true spirit and scope of the present invention.

What is claimed and new and desired to be secured by Letters Patent of the United States is:

1. Apparatus for cooling granular material comprising means defining a generally vertical treating chamber, a material inlet near the lower end of said chamber for introducing granular material into the chamber, an elevator in the form of an endless conveyor carrying a plurality of spaced flights for receiving granular material introduced through said inlet and elevating it upwardly within said chamber upon said flights, a gas inlet in said chamber, means for introducing gas into said inlet so that said gas passes over said flights to entrain at least a portion of the granular material within the gas, a gas outlet disposed vertically above said gas inlet, means defining a tortuous passage communicating with said gas outlet, means for withdrawing the gas within said chamber through said passage and through said outlet, a return means communicating with said tortuous passage and with said chamber for returning to said chamber granular material which settles out of said gas as the gas transverse said tortuous passage, and a material outlet from said chamber, said conveyor having an upper bend for throwing granular material collected on said flights out of said chamber through said material outlet.

2. Apparatus for cooling granular material comprising means defining a treating chamber, a material inlet for introducing granular material into said chamber, an elevator in the form of an endless conveyor carrying a plurality of spaced flights for receiving granular material introduced through said inlet and elevating it upwardly within said chamber upon said flights, a gas inlet in said chamber, means for introducing gas into said gas inlet so that said gas passes over said flights to entrain at least a portion of the granular material within the gas, a gas outlet disposed vertically above said gas inlet, means defining a tortuous passage communicating with said gas outlet, means for withdrawing the gas within said chamber and the material entrained therein through said passage and through said outlet, a material outlet communicating with said tortuous passage and with said chamber for returning to said chamber granular material which settles out of said gas as the gas traverses said tortuous passage, said conveyor having an upper bend for throwing granular material collected on said flights out of said chamber, and means adjacent said upper bend for receiving the granular material thrown from said chamber.

3. Apparatus for cooling granular material comprising means defining a treating chamber, a material inlet for introducing granular material into said chamber, an elevator in the form of an endless conveyor carrying a plurality of spaced flights for receiving granular material introduced through said inlet and elevating it upwardly within said chamber upon said flights, a gas inlet in said chamber, means for introducing gas into said gas inlet so that said gas gas passes over said flights to entrain at least a portion of the granular material within the gas, a gas outlet from said chamber, means for separating the gas and the granular material entrained therein and for exhausting the gas through said gas outlet, material return means for returning to said chamber the granular material separated from said gas, and a material outlet from said chamber, said conveyor having an upper bend for delivering granular material collected on said flights through the material outlet.

4. Apparatus for cooling granular material comprising means defining a treating chamber, a material inlet for introducing granular material into said chamber, an elevator for receiving granular material introduced though said inlet and elevating it upwardly within said chamber, a gas inlet in said chamber, means for introducing gas into said inlet so that said gas passes over said elevator to entrain at least a portion of the granular material within the gas, a gas outlet from said chamber, means for separating the entrained granular material from the gas and for exhausting the gas through the gas outlet, material return means for returning to said chamber the separated granular material, and a material outlet in said chamber communicating with said elevator for receiving granular material after it has been elevated and cooled.

5. Apparatus for cooling granular material comprising means defining a treating chamber, a material inlet for introducing granular material into said chamber, an elevator for receiving granular material introduced though said inlet and elevating it upwardly within said chamber, a gas inlet for delivering gas to said chamber and said elevator in order to entrain at least a portion of the granular material within the gas, a gas outlet from said chamber, means defining a tortuous passage communicating with said gas outlet, means for withdrawing the gas within said chamber through said passage and through said gas outlet, a material return means communicating with said tortuous passage and with said chamber for returning to said chamber granular material which settles out of said gas as the gas traverses said tortuous passage, and a material outlet from said chamber communicating with said elevator to receive granular material collected thereon.

6. Apparatus for cooling granular material comprising means defining a treating chamber, means for introducing granular material into said chamber, an endless conveyor extending upwardly through said chamber and including a plurality of spaced apart material carrying flights thereon for elevating said granular material within said chamber, means for forcibly passing a cooling gas over said granular material as it is elevated in order to entrain a portion of the granular material within the cooling gas, means for separating at least a portion of the entrained material from the gas and returning it to said chamber, means for withdrawing the gas from said chamber after separating said entrained material, and an outlet means for receiving cooled granular material from the upper end of said conveyor for discharge from said chamber.

7. Apparatus for cooling granular material comprising means defining a treating chamber, means for introducing granular material into said chamber, an endless conveyor extending upwardly through said chamber and including a plurality of spaced apart material carrying flights thereon for elevating said granular material within said chamber, means for forcibly passing a cooling gas over said granular material as it is elevated in order to portion of the granular material within means for removing the cooling and separating at least a terial from said gas let means for discharging the granular material from the chamber.

8. Apparatus for elevating granular material comprising an endless conveyor carrying a plurality of spaced apart flights for holding the granular material, first and second spaced apart rollers around which said endless conveyor is trained to define a pair of spaced apart conveyor runs, the first roller being disposed above the second roller means for driving at least one of said rollers in order to drive the conveyor, an element in engagement with one of said runs at a position between the first and second rollers, means responsive to the load on said drive means for automatically adjusting the position of said element in order to vary the configuration of said one run and mounting means movably supporting the second roller, said mounting means including means biasing the second roller for movement in a direction to apply tension to said conveyor so that said conveyor will be properly tensioned irrespective of the change in configuration produced by the automatic adjustment of said element.

9. Apparatus for cooling granular material comprising a housing defining an enclosed generally vertical treating chamber, a material inlet near the lower end of said chamber for introducing granular material into the chamber, an elevator in the form of an endless conveyor carrying a plurality of flights for receiving granular material introduced through the inlet and elevating it upwardly within said chamber upon said flights, a pair of spaced apart rollers supported upon said housing and engaging said conveyor to form a pair of conveyor runs one of which receives granular material delivered through said material inlet, drive means for driving at least one of said rollers in order to move said conveyor and said flights, a gas inlet in said chamber, a gas outlet in said chamber, means for passing gas through said gas inlet into said chamber and through said gas outlet so that said gas picks up granular material to form a granular material laden volume within the chamber, means including a tortuous passageway communicating with said gas outlet for separating the entrained granular material from the gas and returning the separated material to the chamber, an element engaging said one run of said conveyor, means responsive to the load on said drive means for automatically adjusting the position of said element so that the configuration of said one run is altered as the load on said drive means changes, and means for discharging granular material from said conveyor out of said chamber.

10. Apparatus for cooling granular material comprising a housing defining an enclosed treating chamber, a material inlet for introducing granular material into the chamber, an elevator in the form of an endless conveyor carrying a plurality of flights for receiving granular material introduced through the inlet and elevating it upwardly within said chamber upon said flights, said conveyor including a pair of conveyor runs one of which receives granular material delivered through said inlet, drive means for driving said conveyor, a gas inlet in said chamber, a gas outlet in said chamber, means for passing gas through said gas inlet into said chamber and through said gas outlet so that said gas picks up granular material to form a granular material laden volume within the chamber, means for separating the entrained granular material from the gas and returning the separated material to the chamber, an element engaging said one run of said conveyor, means responsive to the load on said drive means for automatically adjusting the position of said element so that the configuration of said one run is altered as the load on said drive means changes, and means for discharging granular material from said conveyor out of said chamber.

11. Apparatus for cooling granular material comprising means defining a treating chamber, a material inlet means for introducing granular material into said chamber, an elevator for receiving granular material introduced through said inlet means and elevating it upwardly within said chamber, means including a gas inlet means for forcibly delivering gas to said chamber and said elevator in order to entrain at least a portion of the granular material within the gas, a gas outlet means from said chamber, means for withdrawing the gas within said chamber through said gas outlet means, means for separating and returning to said chamber the major portion of the granular material entrained within the gas, and a material outlet means from said chamber communicating with said elevator to receive granular material collected thereon.

12. In an apparatus for cooling granular material the combination of a housing defining an enclosed treating chamber, material inlet means for introducing moistened granular material into the chamber, an elevator in the form of an endless conveyor carrying a plurality of flights for receiving granular material introduced through the inlet means and elevating it upwardly within said chamber upon said flights, a pair of spaced apart rollers supported upon said housing and engaging said conveyor to form a pair of conveyor runs one of which receives granular material delivered through said inlet means, drive means for driving at least one of said rollers in order to move said conveyor and said flights, an element engaging said one run of said conveyor, the load on said drive means being a function of the amount and composition of the granular material acting upon the conveyor, outlet means for receiving cooled and dried granular material thrown outwardly from the upper end of the conveyor, the remaining granular material not delivered through the outlet means being returned to the bottom of the chamber for recycling, and means responsive to the load on said drive means for automatically adjusting the position of said element so that the configuration of said one run is altered as the load on said drive means changes, thereby to control the amount of material passing through the outlet means and, hence, to control the amount of material recycled through the chamber.

References Cited in the file of this patent

UNITED STATES PATENTS

| | | |
|---|---|---|
| 707,384 | Burner | Aug. 19, 1902 |
| 2,156,924 | Schneider | May 2, 1939 |
| 2,266,292 | Arnold | Dec. 16, 1941 |
| 2,309,036 | Beardsley | Jan. 19, 1943 |
| 2,556,920 | Hills | June 12, 1951 |
| 2,607,199 | Christensen | Aug. 19, 1952 |

UNITED STATES PATENT OFFICE

CERTIFICATE OF CORRECTION

Patent No. 2,990,624            July 4, 1961

Axel G. Granath et al.

It is hereby certified that error appears in the above numbered patent requiring correction and that the said Letters Patent should read as corrected below.

Column 5, line 38, for "said" read -- sand --; column 6, line 54, for "increasing" read -- increased --; column 7, line 42, for "transverse" read -- traverses --.

Signed and sealed this 21st day of November 1961.

(SEAL)
Attest:

ERNEST W. SWIDER
Attesting Officer

DAVID L. LADD
Commissioner of Patents